(12) United States Patent
Claycomb

(10) Patent No.: US 6,764,750 B1
(45) Date of Patent: Jul. 20, 2004

(54) MULTI-LAYER SURFBOARD WAX SYSTEM

(76) Inventor: Charles E. Claycomb, 1060 Continentals Way #413, Belmont, CA (US) 94002

( * ) Notice: Subject to any disclaimer, the term of this patent is extended or adjusted under 35 U.S.C. 154(b) by 0 days.

(21) Appl. No.: 10/438,950

(22) Filed: May 14, 2003

(51) Int. Cl.[7] .............................. B32B 7/00; B32B 7/02; B32B 9/00
(52) U.S. Cl. ...................... 428/213; 428/212; 428/484; 106/10; 106/36; 106/270; 106/272
(58) Field of Search ............................. 428/212, 213, 428/484; 106/10, 36, 270, 272; 441/74; 431/288, 289, 291; 280/809, 601, 610

(56) References Cited

U.S. PATENT DOCUMENTS

| | | | |
|---|---|---|---|
| 1,320,855 A | * 11/1919 | Hendersen | 424/73 |
| 3,279,999 A | * 10/1966 | Harrison et al. | 424/49 |
| 3,983,677 A | * 10/1976 | Lundbom | 53/415 |
| 4,225,552 A | * 9/1980 | Chang | 264/247 |
| 4,568,270 A | * 2/1986 | Marcus et al. | 431/288 |
| 4,828,885 A | * 5/1989 | Rosenberg | 427/387 |
| 5,150,978 A | * 9/1992 | Stewart et al. | 401/14 |
| 5,219,238 A | * 6/1993 | Hainbach | 401/52 |
| 5,597,300 A | * 1/1997 | Wohl et al. | 431/288 |
| 2002/0041788 A1 | * 4/2002 | Look et al. | 401/68 |
| 2002/0127192 A1 | * 9/2002 | Murphy et al. | 424/64 |

* cited by examiner

Primary Examiner—Vivian Chen
(74) Attorney, Agent, or Firm—Adam Bell

(57) ABSTRACT

A multi-layer wax bar for waxing a surf board, that includes both a higher melting point base coat wax and a second topcoat wax in the same bar. The two waxes are bonded together so that the surfer can carry a single bar of wax into the water and use it to apply both the base coat and the topcoat of wax.

6 Claims, 1 Drawing Sheet

MULTI-LAYER SURFBOARD WAX SYSTEM

FIELD OF THE INVENTION

The invention relates to waxes used to coat the upper side of surf boards.

BACKGROUND & PROBLEM STATEMENT

Surfers apply wax to the top of their boards to enhance grip between their feet and the board. Different types of surfboard waxes are used for different conditions and water temperatures. Soft, tackier wax is used for cold water and harder base paraffin wax (melts at a higher temperature) is used for warmer waters. Wax is also applied to body boards and wakeboards for the same reason. Early surfers used candle wax. Then in the 1930s they started using paraffin canning wax. This had to be melted onto the board and created a very hard surface. Sometimes sand would be added into the wax to improve grip. Then, in the 1960s waxes began to be made using oil and soft waxes like beeswax. Later, colors and fragrances were added. Today many of the waxes are synthetic blends of petroleum-based polymers. Some surfers wax the bottom of their boards with wax or fluoropolymer surface coatings to decrease resistance with the water and to protect to board.

Currently two coats of different types of wax are used for coating the top of surfboards. These two waxes are provided in separate bars. The first coat is known as a "basecoat" and is applied to a new or freshly cleaned surfboard. The basecoat wax is has a higher melting temperature than the second coat, and is harder and less likely to melt away in the elements. The basecoat protects the board and provides a base (a "key") for the second coating of wax. The second coat, here called a "topcoat," has a lower melting temperature and is applied to the first coat. This topcoat is a softer than the basecoat and is tacky. It has a lower melting temperature than the basecoat and provides traction for the surfer's feet.

While surfing, the two layers of surfboard wax wear off and bare spots are worn through to the surfboards fiberglass surface. The topcoat wears of fairly quickly, exposing the basecoat. The basecoat then wears away, exposing the surface of the board, which is slippery. This usually occurs where the knees, stomach, and shoulders rub on the surfboard during paddling and waiting for waves. This results in a slippery surface that makes surfing increasingly dangerous and less entertaining.

Today surfers use small pieces of topcoat wax (that of a lower melting temperature) to try and patch the bare spots in the fiberglass. This is not very effective due to the absence of a base coat of wax. The result is that the topcoat wax, without the base coat, usually wares off quite quickly onto the surfers body or wetsuit in a matter of a few paddle strokes. The bear patch is then exposed again.

DESCRIPTION OF THE INVENTION

The invention encompasses a multi-layer wax bar for waxing a surf board, that includes both a higher melting point base coat wax and a second topcoat wax in the same bar, The two waxes are bonded together so that the surfer can carry a single bar of wax into the water and use it to apply both the base coat and the topcoat of wax.

DETAILED DESCRIPTION OF THE INVENTION

Figure 1:
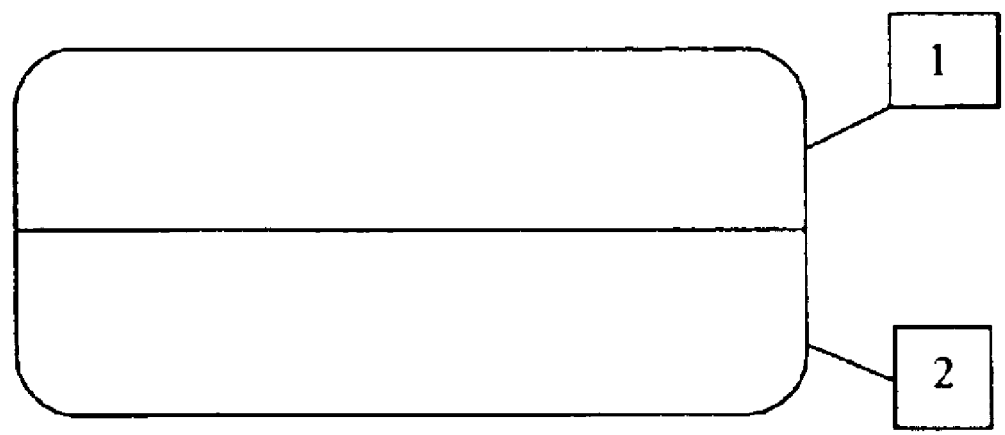
FIG. 1. A cake of wax with two parts bonded together, showing base coat (higher melting point) wax (1) and the topcoat wax (2).

The invention encompasses a multi-layer surfboard wax system in which both a basecoat wax of a higher melting point and a topcoat wax of lower melting point are present within the same bar of wax. This will allow surfers to use a single bar of wax to apply small amounts of basecoat to the bare spots that develop on their surfboard, before flipping the bar over and applying the sticky topcoat wax. The surfer can do this while in the water using one small piece of two-sided layered wax, and will be able to correctly and effectively solve the problem of reoccurring bare spots.

Basecoat and topcoat waxes can be obtained commercially from suppliers, and waxes have been formulated for many years using natural and synthetic ingredients. The present invention may use any combination of available wax.

The new bar of two-layered wax will use two different melting temperature waxes that will be combined together, for example using heat and or pressure and taking advantage of the natural bonding properties of the wax. The end product will be packaged in various sizes to accommodate different size surfboards, surfing climates and personal preferences. Different sets of melting temperature waxes will be used for different ocean temperatures and combined for the end product. For example a bar of cool-water wax might consist of two different melting temperature waxes one that melts at 40 degrees Farenheight for the basecoat and one that melts at 55 degrees Farenheight for the topcoat.

The temperatures of both layers of the wax will vary depending on the water temperature.

In certain embodiments the two wax layers may be of different colors to distinguish one layer from the other. Fluorescent dyes may also be used. Different dyes or particulate substances may be incorporated into the wax. For example sparkly particles may be incorporated into one or more of the layers. Additionally, substances may be incorporated into the layers that impart a particular texture, such as a granularity to the wax.

The invention may be used with any type of board used for water sports such as a surfboard, a wakeboard a boogie board etc, and is not limited to use with a surfboard. The invention is not limited to the examples disclosed herein, but encompasses other equivalent structures and uses.

What is claimed is:

1. A multi-layer wax cake for waxing a surfboard comprising a first wax layer and a second wax layer, wherein the two wax layers are bonded together, and wherein the two wax layers have different melting temperatures wherein the first wax layer is a basecoat surfboard wax and the second wax layer is a topcoat surfboard wax and wherein the basecoat and the topcoat surfboard waxes are applied separately to the surfboard.

2. The multi-layer wax cake of claim 1 wherein the basecoat surfboard wax has a higher melting temperature than the topcoat surfboard wax.

3. The multi-layer wax cake of claim 2 wherein at least one wax layer comprises a colored dye.

4. The multi-layer wax cake of claim 2 wherein at least one wax layer comprises a textured additive.

5. The multi-layer wax cake of claim 2 wherein the basecoat surfboard wax is present in a larger amount than the topcoat surfboard wax.

6. The multi-layer wax cake of claim 2 wherein the shape of the cake, when viewed from above, is selected from the group consisting of: a rectangle, a square, a triangle, and a circle.

* * * * *